United States Patent [19]
Penny, Jr.

[11] Patent Number: 6,070,050
[45] Date of Patent: May 30, 2000

[54] METHOD AND APPARATUS FOR DELIVERING MESSAGES TO DEVICES LOCATED WITHIN LOGICAL DELIVERY AREAS

[75] Inventor: Robert E. Penny, Jr., Gilbert, Ariz.

[73] Assignee: Motorola, Inc., Schaumberg, Ill.

[21] Appl. No.: 08/943,538

[22] Filed: Oct. 3, 1997

[51] Int. Cl.[7] .................................................. H04Q 7/20
[52] U.S. Cl. ........................................ 455/12.1; 455/13.2
[58] Field of Search ............................. 455/121.1, 13.2, 455/427, 429, 414, 445, 430; 340/825.44, 825.49, 825.52, 825.03

[56] References Cited

U.S. PATENT DOCUMENTS

| | | | |
|---|---|---|---|
| 5,129,095 | 7/1992 | Davis et al. | 455/32.1 |
| 5,659,298 | 8/1997 | Brooks et al. | 340/825.44 |
| 5,717,686 | 2/1998 | Schiavoni | 370/321 |
| 5,721,534 | 2/1998 | Olds et al. | 455/12.1 |
| 5,860,058 | 1/1999 | Daniel et al. | 455/427 |
| 5,883,580 | 3/1999 | Briancon et al. | 340/825.44 |

*Primary Examiner*—William G. Trost
*Assistant Examiner*—Jean A. Gelin
*Attorney, Agent, or Firm*—Sherry J. Whitney; James E. Klekotka

[57] ABSTRACT

A global message delivery system (100) transmits messages to messaging devices (130) using a plurality of satellites (110). In order to facilitate message delivery, the surface of the earth is divided into a number of logical delivery areas (202) (LDAs). Each satellite provides at least one beam (210) which spans one or more LDAs (202). When a request is received (704) to deliver a message to a messaging device (130), an Opportunity Table (600) is used to quickly determine which beam (210) to use to deliver the message. The Opportunity Table (600) correlates the messaging device's location and upcoming activation times with which beams (210) are covering which LDAs (202).

18 Claims, 5 Drawing Sheets

*402*

| DESTINATION MESSAGING DEVICE ID NUMBER | DESTINATION DEVICES LAST KNOWN LOCATION ||
|---|---|---|
| | LDA COORDINATES | LDA NUMBER |
| 1 | R73,P1 | 11851 |
| 2 | R1,P0 | 1 |
| 3 | R74,P262 | 12381 |
| 4 | R83,P263 | 14780 |
| ⋮ | ⋮ | ⋮ |
| N | R82,P3 | 14254 |

404 — 406

*400*

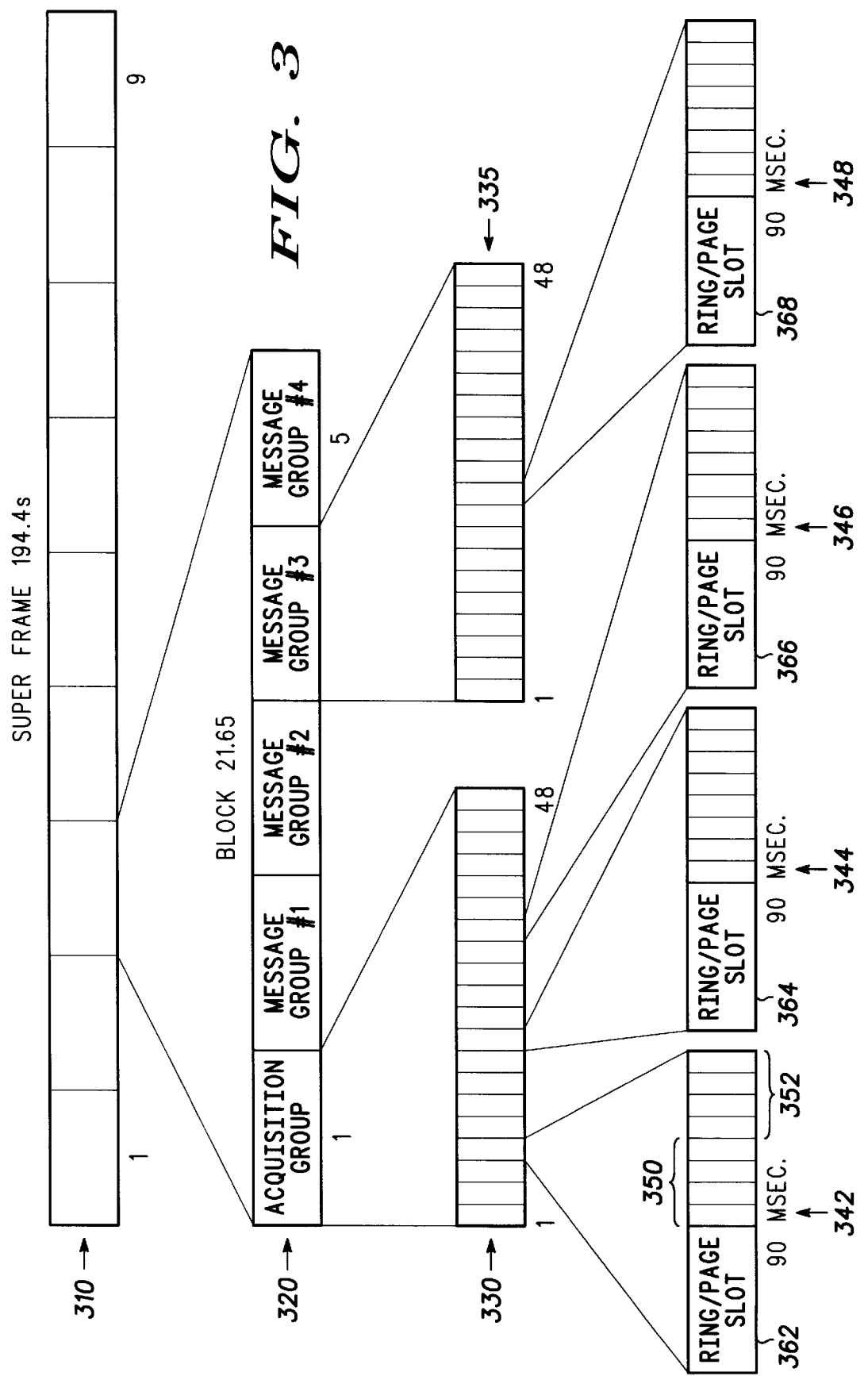

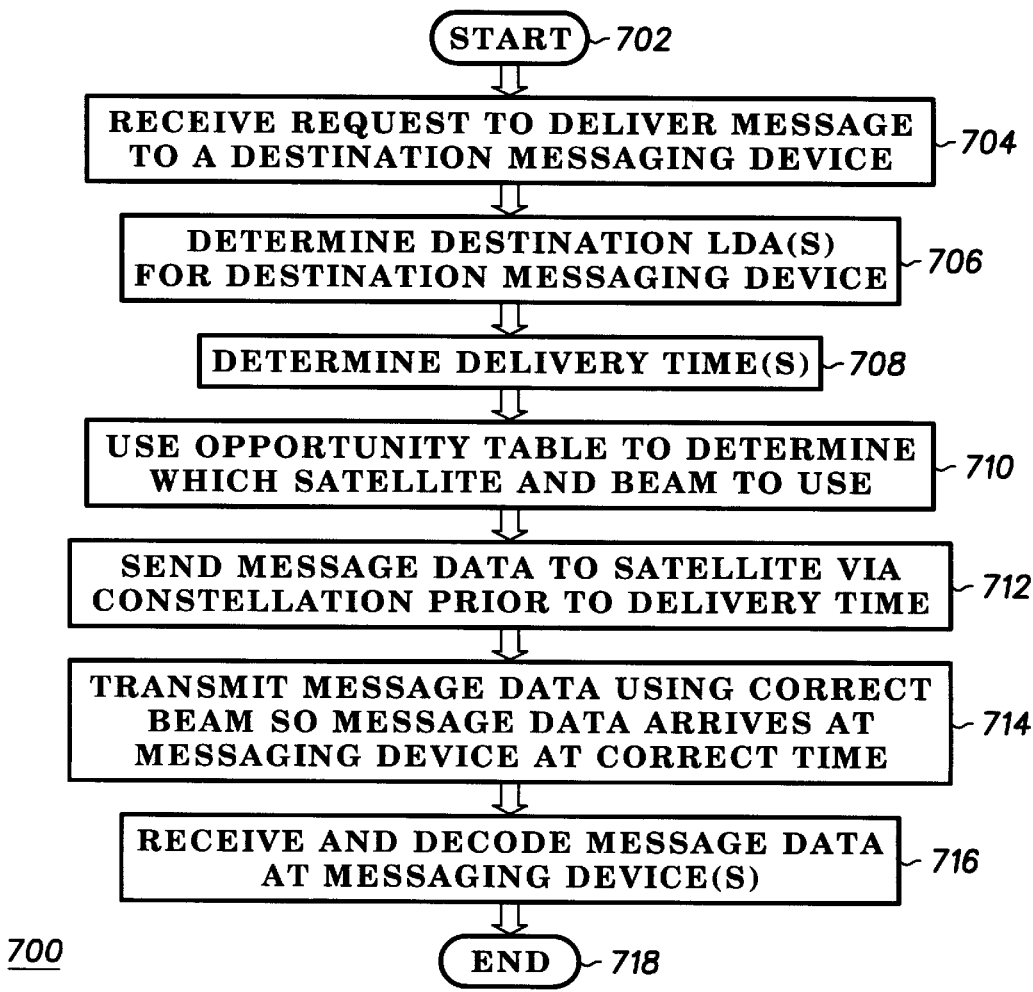

| DESTINATION MESSAGING DEVICE ID NUMBER | LISTENING SCHEDULE | |
|---|---|---|
| | SUPER FRAME # | FRAME # |
| 1 | 1 | 1 |
| 2 | 1 | 4 |
| 3 | 1 | 3 |
| ⋮ | ⋮ | ⋮ |
| N | 3 | 1 |

FIG. 5

| SUPER FRAME NUMBER | FRAME NUMBER | LDA COORDINATES | LDA NUMBER | SATELLITE NUMBER | BEAM NUMBER |
|---|---|---|---|---|---|
| 1 | 1 | R0,P0 | 1 | SV32 | B24 |
| 1 | 1 | R0,P1 | 2 | SV32 | B24 |
| ⋮ | ⋮ | ⋮ | ⋮ | ⋮ | ⋮ |
| 1 | 1 | R73,P1 | 11851 | SV7 | B12 |
| ⋮ | ⋮ | ⋮ | ⋮ | ⋮ | ⋮ |
| 1 | 1 | R155,P0 | 26631 | SV15 | B6 |
| 1 | 2 | R0,P0 | 1 | SV32 | B24 |
| ⋮ | ⋮ | ⋮ | ⋮ | ⋮ | ⋮ |
| 1 | 2 | R155,P0 | 26631 | SV15 | B6 |
| ⋮ | ⋮ | ⋮ | ⋮ | ⋮ | ⋮ |
| 2 | 1 | R0,P0 | 1 | SV16 | B33 |
| ⋮ | ⋮ | ⋮ | ⋮ | ⋮ | ⋮ |
| 2 | 1 | R155,P0 | 26631 | SV27 | B16 |

METHOD AND APPARATUS FOR DELIVERING MESSAGES TO DEVICES LOCATED WITHIN LOGICAL DELIVERY AREAS

FIELD OF THE INVENTION

This invention relates generally to message delivery systems and, more particularly, to using logical delivery areas in satellite-based message delivery systems.

BACKGROUND OF THE INVENTION

A cellular communication system projects a number of cells onto the earth in order to provide communication channels between the system and messaging devices. In a terrestrial cellular system, beams which define these cells radiate about or from a cell site. In a satellite cellular system, the beams are projected by satellites. Messages directed to messaging devices are typically routed through a gateway to a cell site or satellite projecting a beam in which the destination messaging device resides.

In satellite-based communication systems, satellite orbit propagation and/or spherical dynamics are often used to determine which beam of which satellite to use in order to send a message to a messaging device at a particular location. This requires the system to perform complicated calculations for each message to be delivered, thus consuming valuable system resources.

What is needed is a simpler approach to locating a messaging device and delivering a message to the messaging device. Additionally, what is needed is a apparatus and methods for establishing a relationship between satellite beam patterns and messaging device location. Furthermore, what is needed is an efficient method of mapping mobile messaging devices to existing location identification systems.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

FIG. 3 illustrates a frame structure for use by the message delivery system in accordance with a preferred embodiment of the present invention;

FIG. 4 shows a table illustrating the relationship between messaging devices and LDAs in accordance with a preferred embodiment of the present invention;

FIG. 5 shows a table which illustrates a listening schedule for the messaging devices in accordance with a preferred embodiment of the present invention;

FIG. 6 illustrates an Opportunity Table for use by the message delivery system in accordance with a preferred embodiment of the present invention;

FIG. 7 illustrates a flow diagram for a method of delivering a message to a messaging device in accordance with a preferred embodiment of the present invention;

DETAILED DESCRIPTION OF A PREFERRED EMBODIMENT

The present invention provides a simpler approach to locating a messaging device and delivering a message to the messaging device. In addition, the present invention provides an apparatus and method for establishing a relationship between satellite beam patterns and messaging device location. Also, the present invention provides an efficient method of mapping mobile messaging devices to existing location identification systems.

Figure 1:
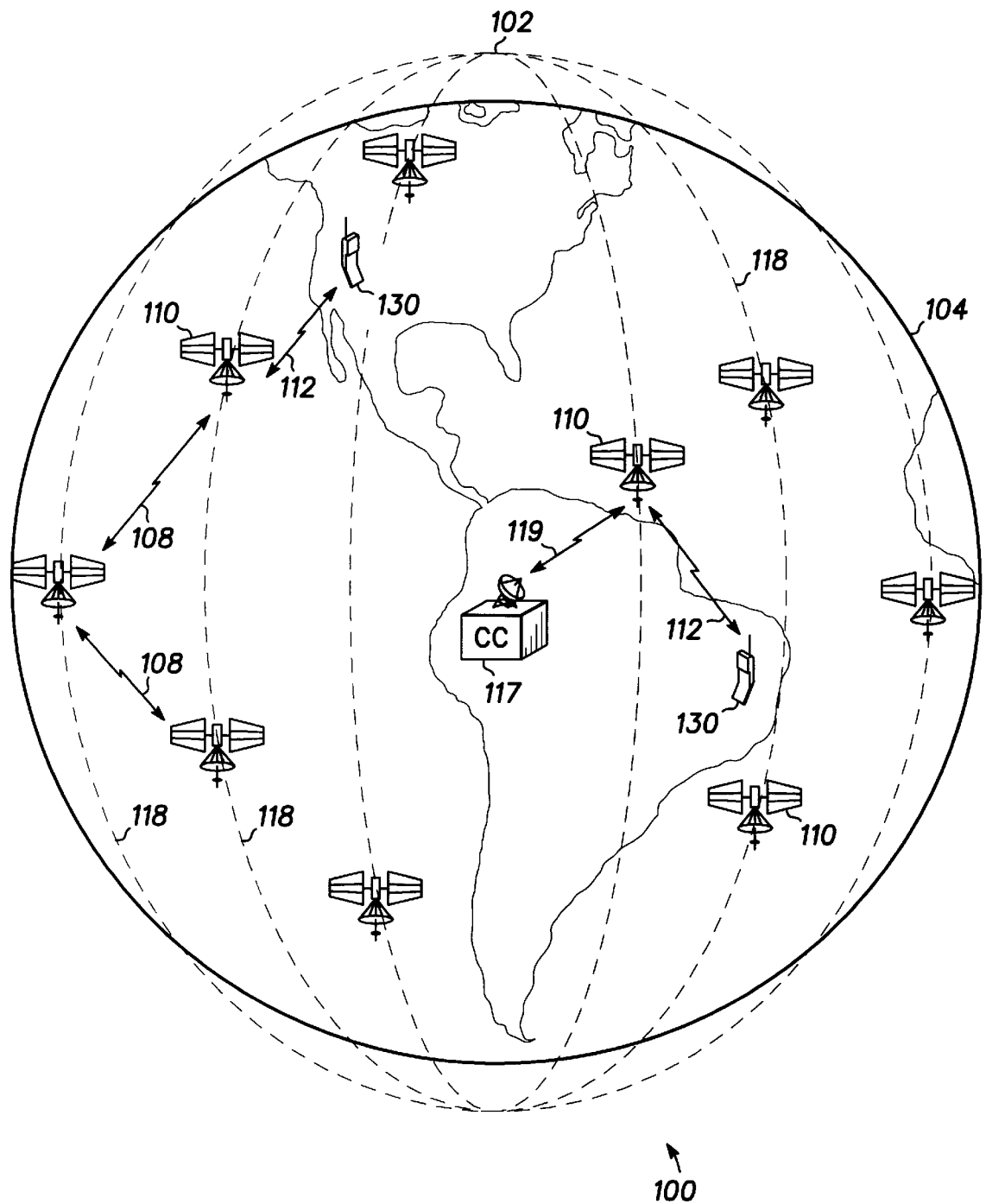
FIG. 1 shows a diagram of a satellite-based message delivery system within which the present invention may be practiced.

FIG. 1 shows a diagram of a satellite-based message delivery system within which the present invention may be practiced. A constellation 102 consisting of several satellites 110 is placed in a relatively low orbit around the earth.

System 100 includes one or more control centers 117. Control centers 117 reside on the surface of the earth and are in communication with nearby satellite(s) 110 through link 119. Satellites 110 are also in communication with one another through cross-links 108. In order to synchronize communication and minimize interference, all satellites 110 are desirably locked together in time through intervention of a ground based satellite control function. Thus, all satellites 110 in the constellation essentially run on the same system time. Through constellation 102 of satellites 110, control center 117 controls messages delivered to any size region of the earth.

System 100 also includes any number, potentially in the millions, of messaging devices 130. Messaging devices 130 may be configured as conventional messaging devices or portable radio communication equipment. Messaging devices 130 are configured to receive communications from satellites 110 and to perform other functions which are discussed below. Messaging devices 130 communicate with nearby satellites 110 through links 112. Links 112 may consist of broadcast channel(s), traffic uplink and downlink channels, and acquisition channels, for example.

Control centers 117 couple to public switched telecommunication networks (PSTN; not shown), from which messages directed toward messaging devices 130 may be received. Messages are sent from control centers 117 to messaging devices 130 via satellites 110. Control centers 117 receive requests to send messages from other subscribers, or from communication devices associated with the PSTN. In an alternate embodiment, a centralized control center is used and can be separated from the PSTN.

Figure 2:
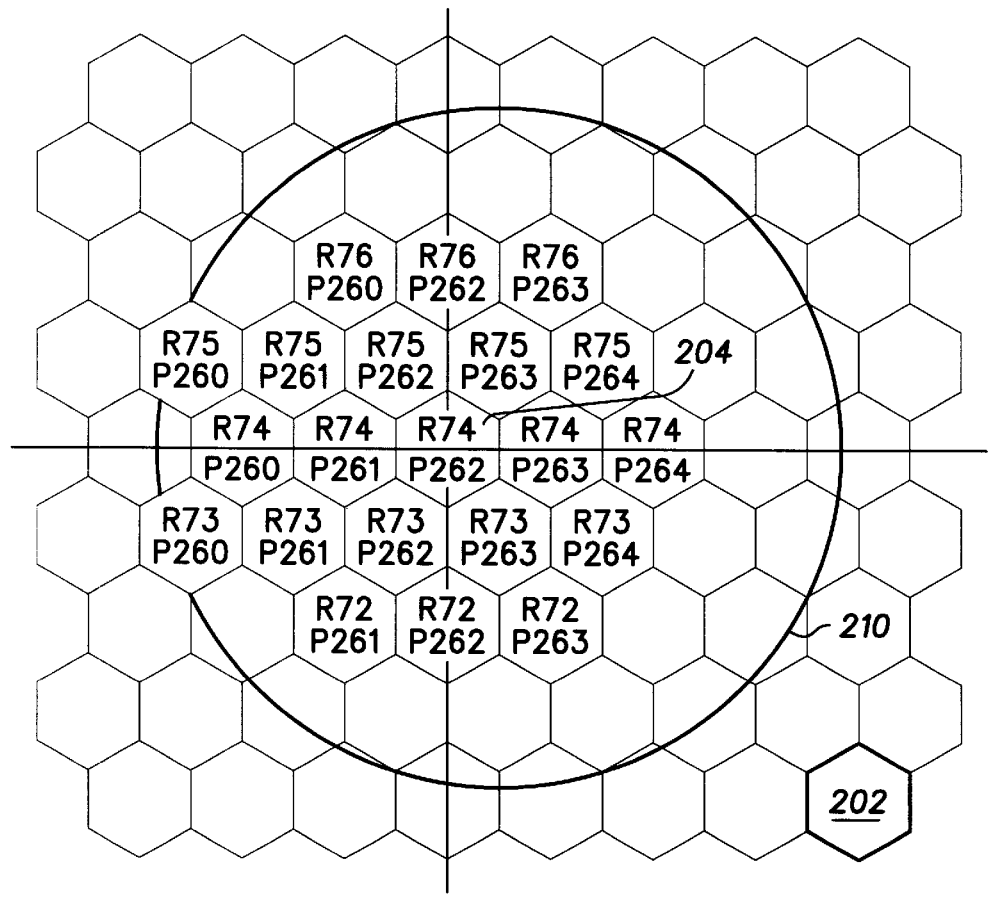
FIG. 2 shows a diagram of logical delivery areas and an antenna beam pattern projected by a satellite upon the surface of the earth in accordance with a preferred embodiment of the present invention.

FIG. 2 shows a diagram of logical delivery areas (LDAs) and an antenna beam pattern projected by a satellite upon the surface of the earth in accordance with a preferred embodiment of the present invention. In a preferred embodiment, earth's surface is divided into approximately equal sized and nearly symmetrical polygonal geographic areas known as LDAs 202. In an alternate embodiment, LDAs 202 could have variable shapes and sizes.

Antenna beam 210 is shown encompassing a plurality of LDAs. In a preferred embodiment, the size of the LDA is determined so that one beam covers at least one LDA.

For exemplary purposes, LDAs 202 could be identified by sequential numbers. In addition or alternatively, each LDA 202 could be identified using a row and position number. For example, the first row could be at the south pole, and the last row could be at the north pole. Within each row, adjacent LDAs could be identified by position numbers. As shown in FIG. 2, rows are identified with the prefix "R" and positions are identified with the prefix "P". Thus, the center LDA 204, identified by R74, P262, occurs in the 74th row and the 262nd position. In a preferred embodiment, 26,631 LDAs are mapped onto the surface of the earth, using 155 rows and up to 266 positions within each row. In alternate embodiments, different numbers of LDAs, rows, or columns could be used. In addition, different identification codes (besides LDA number and/or row/column number) could be used to identify a particular LDA and/or its location.

The numbering scheme provides a mathematical relationship between each LDA and its neighbors. For example, desired coverage areas can be determined using simple mathematical processes. Adjacent LDAs can be identified by adding and subtracting one from the position number. This identifies LDAs to the right and the left, respectively. LDAs above a particular LDA are identified by adding one to the row number. LDAs below the target LDA are identified by subtracting one from the row number.

In a preferred embodiment, satellites have substantially the same antenna patterns and employ frequency spectrum reuse techniques. These antenna patterns are associated with antennas on satellites. These antennas may be individual directional antennas or phased array antennas capable of multiple beam projection. In accordance with the method and apparatus of the present invention, at a particular time, antenna beam 210 can be correlated with a reference LDA 220. In FIG. 2, reference LDA 220 for antenna beam 210 is identified as LDA 204 (R74, P262).

Antenna beam 210 may assume various positions and shapes depending on the characteristics of the antennas and the position of the satellite. Satellite-fixed antenna patterns advance relative to a fixed spot on the surface of the earth in a direction determined by the satellite's orbit direction. This means that the reference LDA associated with each antenna beam changes with time. A reference LDA for an earth-fixed antenna pattern might not change as rapidly with time, but the shape of the antenna pattern could change significantly.

The message delivery system of the preferred embodiment primarily uses time division multiplexing (TDM) with limited frequency division multiplexing (FDM). These time and frequency resources are organized into an operational hierarchy that determines which time and frequency resources are available at any time.

In a preferred embodiment, each messaging device 130 (FIG. 1) is assigned a position in the time and frequency hierarchy when the device is manufactured, or when it is re-programmed. This assignment determines when the messaging device becomes active and what frequency access channels it monitors. Message delivery service system 100 is responsible for tracking the individual messaging device assignments and insuring that the pages are delivered at the appropriate time on the correct frequency access. In a preferred embodiment, message delivery system 100 uses LDAs 202 to establish relationships between messaging device positions and satellite beams 210.

FIG. 3 illustrates a frame structure for use by the message delivery system in accordance with a preferred embodiment of the present invention. FIG. 3 illustrates a four-level timing hierarchy. The highest level of this hierarchy is a 194.4 second (2160 frames) superframe 310. The superframe 310 comprises nine paging blocks 320 of 21.6 seconds (240 frames) each. Each block 320 comprises five groups, two of which are shown as block 330 and block 335 of 4.32 seconds (forty-eight frames) each. Finally, each of groups 330 and 335 comprise forty-eight 90 ms L-Band frames 342, 344, 346, and 348. The simplex message time slots 362, 364, 366, and 368 occupy 20.48 ms of the 90 ms L-Band frames 342, 344, 346, and 348, respectively. In a preferred embodiment, a frame comprises a ringing and paging time slot, followed by four uplink time slots 350 and four downlink time slots 352. It will be understood by one of ordinary skill in the art that the above-described timing hierarchy is merely exemplary and that many other variations are possible, depending upon the particular system requirement.

In a preferred embodiment, each messaging device is active during one of blocks 320. Messages may be sent to an active messaging device during any frame of any group within its active block. The first group of every block 320 is the Acquisition Group 330 for that block. The Acquisition Group 330 includes a special Block Header Message that indicates in which frames in the subsequent groups of the block messages will be sent to the area covered by the Acquisition Group 330. Also, the Block Header Message is repeated in beams neighboring the area. This allows messaging devices to return to a lower power mode if they are not in an area that will receive messaging traffic during their assigned block. The remaining four groups in block 320 are message groups which do not include the Acquisition Group header 330 and which provide most of the message capacity of the block 320.

FIGS. 4–6 illustrate tables which can be used in a preferred embodiment of the method of the present invention to determine message delivery opportunities and the satellite/beam within which a message should be delivered to a particular messaging device or devices. FIG. 7 illustrates a method which uses the exemplary tables of FIGS. 4–6 for that purpose.

FIG. 4 shows a table 400 illustrating the relationship between messaging devices and LDAs in accordance with a preferred embodiment of the present invention. In a preferred embodiment, the table is stored in control center 117 (FIG. 1), although the table could be stored elsewhere in the system.

Each messaging device is identified using a messaging device identification (ID) number, listed sequentially in column 402. The last known location(s) for each messaging device is associated with each messaging device ID entry in columns 404, 406. In a preferred embodiment, this location is given relative to the LDA coordinate system. For example, a location of messaging device #3 can be identified using coordinates (R74, P262) in column 404 or using the LDA number (12381) in column 406. Other location descriptions are accommodated using LDA conversion tables.

FIG. 5 shows a table 500 which illustrates a listening schedule for the messaging devices in accordance with a preferred embodiment of the present invention. A "listening schedule" identifies when, within the frame structure of a system, a particular messaging device is active and able to receive messages. In a preferred embodiment, the messaging devices are battery operated and they use wake and sleep cycles (modes) to conserve power. The control center stores the listening schedule for the messaging devices. In a preferred embodiment, the table is stored in control center 117 (FIG. 1), although the table could be stored elsewhere in the system. Each messaging device is identified using a messaging device identification number, listed sequentially in column 502. A block and frame number, which are associated with each messaging device ID number in columns 504 and 506, respectively, indicate when each messaging device will be actively listening for a message. As an example, messaging device #3 is scheduled to be active (i.e., to wake up and listen for messages) during the first frame located within the third block.

FIG. 6 illustrates an Opportunity Table 600 for use by the message delivery system in accordance with a preferred embodiment of the present invention. The Opportunity Table identifies, for a future period of time, which LDAs will be covered by which satellite beams on a frame-by-frame basis. In a preferred embodiment, the table is stored in control center 117 (FIG. 1), although the table could be stored elsewhere in the system. In a preferred embodiment, using an Opportunity Table permits the generation of satellite to earth coverage determination without having to propagate orbital elements and antenna fields of view in real time to determine which satellite is covering which LDA at which time.

The Opportunity Table is a transmitting schedule for the satellites in the message delivery system, and it is based on the LDA coordinate system. FIG. 6 shows a frame-by-frame set of message delivery opportunities with respect to the LDA coordinate system. In a preferred embodiment, every LDA is listed for each superframe and frame. In an alternate embodiment, this table may also include transmission frequencies and other data. The Opportunity Table is a frame-by-frame listing of which beams (B) on which satellites (SV) cover which LDAs.

A scheduled delivery time, identified in a preferred embodiment by a block and frame number in columns 602 and 604, respectively, is used as an upper level pointer into the Opportunity Table. In a preferred embodiment, the delivery time is identified using a table such as that exemplified in FIG. 5. In alternate embodiments, the delivery time could be received from some other source. In a preferred embodiment, the block and frame numbers correspond to future points in time which are synchronized to the system clock.

The destination device's location within the LDA coordinate system, identified in a preferred embodiment by a LDA row/position and LDA number in columns 606 and 608, respectively, is used as a lower level pointer in the Opportunity Table. In a preferred embodiment, the device location is identified using a table such as that exemplified in FIG. 4. In an alternate embodiments, the device location could be received from some other source. These pointers enable determination of the actual destination satellite (SV), in column 610, and beam (B), in column 612, to use to deliver the message as will be described in detail in conjunction with FIG. 7. In alternate embodiments, the Opportunity Table could be differently configured in order to correlate opportunity times and device location to destination satellites and beams. Along those lines, the pointers used to access the information could be used in different orders. In addition, the destination beam could be identified, for example, on a system1 wide basis, rather than on a satellite-by-satellite basis.

FIG. 7 illustrates a flow diagram for a method of delivering a message to a messaging device in accordance with a preferred embodiment of the present invention. Procedure 700 is practiced by a control center (e.g., control center 117, FIG. 1) in the message delivery system in a preferred embodiment. In alternate embodiments, all or part of the method could be practiced in other nodes of the system. Procedure 700 starts with step 702.

In step 704, a request to deliver a message to a destination messaging device is received by a control center The destination messaging device is desirably identified in the request by its messaging device identification number.

In step 706, the last known location for the destination device is determined. In a preferred embodiment, the last known location is determined using the messaging device identification number as a pointer into a table such as the table shown in FIG. 4. In a preferred embodiment, the location is established using the LDA coordinate system of rows and positions and/or associated LDA number. In alternate embodiments, additional tables are used to cross-reference LDAs to other positioning systems.

Also in a preferred embodiment, the system calculates adjacent LDAs and/or beams within which to transmit a message in order to increase the likelihood that the destination messaging device will be able to receive the message. In accordance with a preferred embodiment, adjacent LDAs are easily determined using the sequential numbering scheme described above. For example, FIG. 2 indicates that, to determine LDAs adjacent to LDA 204 (R74, P262), one only needs to add or subtract one to a row number (yielding R75 and R73) and/or add or subtract one from the position number (yielding P261 or P263).

In step 708, the control center determines at least one delivery time. The message must be scheduled to arrive during the period of time when the destination device is active (i.e., awake and listening for messages). The frame or frames within which a destination messaging device is active is determined using the messaging device identification number as a pointer into a table such as the table shown in FIG. 5. In a preferred embodiment, a first delivery time and subsequent delivery times are determined. The first delivery time is an upcoming frame in which the destination messaging device will be awake and listening. Alternatively, only a single delivery time could be determined.

In step 710, the control center determines which satellite and which beam to use to deliver the message to the destination device at the correct delivery time. In a preferred embodiment, the control center uses an Opportunity Table, such as the Opportunity Table shown in FIG. 6, to determine which satellite and beam to use. The control center uses the first delivery time as an upper level pointer into the Opportunity Table (see columns 602, 604, FIG. 6). The destination device's location within the LDA coordinate system (e.g., LDA number or LDA row/position) is used as a lower level pointer in the Opportunity Table (see columns 606, 608, FIG. 6). These two pointers allow a determination of a destination beam which will be capable of delivering the message during the appropriate time. The message also contains scheduling information. The destination beam is the beam which will be used to transmit the message to the messaging device.

In step 712, the control center sends the message data to the destination satellite prior to the first delivery time. In step 714, the satellite transmits the message data using the destination beam during the first delivery opportunity. In a preferred embodiment, the satellite can store message data and transmit the message data at a later time.

In step 716, the message data is received and decoded by the messaging device. After step 716, procedure 700 ends. In a preferred embodiment, a message could be retransmitted during subsequent opportunity times, if necessary. These subsequent opportunity times could be determined sequentially by repeating steps 708–716, or multiple delivery times could be determined in parallel.

In order to further illustrate the method of the present invention, an example is provided. Assume a control center receives a request (step 704) to send a message to a destination device with #001 as its message ID number. The control center uses device ID #001 to determine (step 706) the destination device's last known location using a table such as that shown in FIG. 4. In this example, the results obtained from FIG. 4 are LDA number (111851) and LDA coordinates (R73, P1). The control center also uses device ID #001 to determine (step 708) the destination device's listening schedule using a table such as that shown in FIG. 5. In this case, destination device #001 is active and listening during the first frame in the first superframe. The control center uses (step 710) superframe #1 and frame #1 to establish an upper level pointer into an Opportunity Table such as that shown in FIG. 6. The control center also uses the LDA number (11851) (or LDA row/position, R73, P1) to provide the lower level pointer into the Opportunity Table. In so doing, the satellite number (SV7) and beam number (B12) are determined from the Opportunity Table. Thus, the control center has determined that, in order to send the message to device #001, the message should be delivered to SV7 prior to frame #1 of superframe #1. SV7 will then desirably deliver the message during frame #1 of superframe #1 using beam 12.

Figure 8:
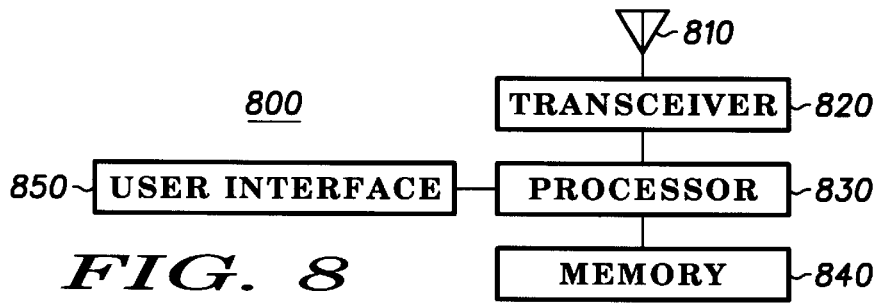
FIG. 8 shows a simplified block diagram of a messaging device in accordance with a preferred embodiment of the present invention.

FIG. 8 shows a simplified block diagram of a messaging device in accordance with a preferred embodiment of the present invention. Messaging device 800 includes an antenna 810 through which a communication link is established with a communication system. Antenna 810 feeds a transceiver 820, which desirably includes radio-frequency (RF), mixing, and intermediate frequency (IF) stages (not shown) as needed to convert RF signals sent by the system into digital data. Transceiver 820 couples to a processor 830 which processes the digital data.

Processor 830 couples to memory 840, but may also include means for internal storing. Memory 840 is used to store software programs that instruct messaging device 800 to perform various procedures. In addition, data stored in memory 840 could include variables and tables which are used in the operation of messaging device 800. Temporary data can also be stored in memory 840. Memory 840 is used to store wake and sleep mode schedule.

Processor 830 also couples to user interface 850 which may comprise various peripheral devices, such as a display, an alarm, and an input device. For example, processor 830 can control a display to visibly present data to a user. In addition, processor 830 can control an alarm to notify a user audibly and/or physically that a message has been received. In an alternate embodiment, processor 830 can receive a user input, preferably through the operation of keys or buttons (not shown) through user interface 850.

Processor 830 utilizes a timer to synchronize its operations with system timing and, in one embodiment, to keep track of the time of day. Processor 830 uses timing information from the Acquisition Group to update timing on messaging device 800. Those skilled in the art will appreciate that the function of a timer may be accomplished using software processes performed within processor 830.

In a preferred embodiment, messaging device 800 is energized by a battery (not shown). Messaging device 800 can be partially energized or fully energized for power conservation reasons. Those skilled in the art will appreciate that power may be continuously applied to at least a portion of memory 840 during the low-power mode (i.e., the "sleep mode") to prevent the destruction of data. The messaging device 800 as shown in FIG. 8 could be used in the system described herein to achieve the advantages of the present invention.

Figure 9:
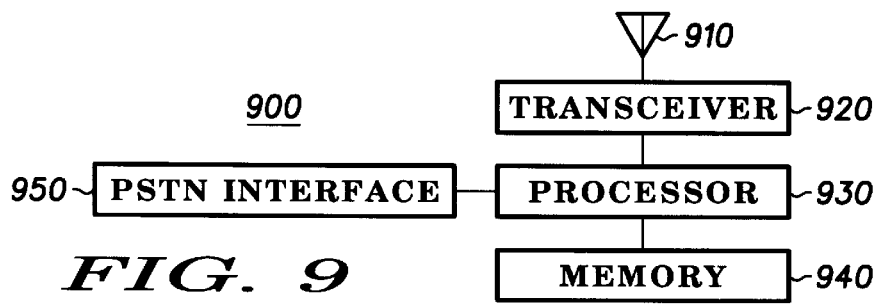
FIG. 9 shows a simplified block diagram of a control center in accordance with a preferred embodiment of the present invention.

FIG. 9 shows a simplified block diagram of a control center in accordance with a preferred embodiment of the present invention. Control center 900 includes an antenna 910 through which a communication link is established either directly or indirectly with the rest of the system and with messaging devices. Antenna 910 feeds a transceiver 920, which includes RF, mixing, and IF stages (not shown) as needed to convert RF signals which are transmitted an received by control center 900. Transceiver 920 couples to a processor 930 which processes the digital data.

Control center 900 also includes a memory 940 which stores permanent and temporary data. Such permanent and temporary data include computer programs and/or data such as the tables exemplified in FIGS. 4–6. In a preferred embodiment, system time (which can be correlated to superframes and frames) is maintained by one or more control centers 900. Desirably, each node of the system, including satellites and messaging devices, is synchronized to the system time.

Processor 930 allows control center 900 to keep a current system time and to send transmissions from control center 900 in accordance with scheduled message delivery times.

Through a public switched telecommunications network (PSTN) interface 950, processor 930 desirably couples to the PSTN. Requests to send messages to messaging devices may be received through PSTN interface 950, through antenna 910, or through other inputs (not shown).

In a preferred embodiment of the present invention, control center 900 performs an opportunity table generation (OPGEN) process to establish when messages can be delivered to messaging devices. Execution of the OPGEN process desirably results in an Opportunity Table such as that shown in FIG. 6. In alternate embodiments, one or more other system nodes could perform all or parts of the OPGEN process.

In a preferred embodiment, the OPGEN process has the Messaging Active Beam Schedule (MABS) and the satellite's ephemeris as inputs. The MABS prescribes which beams on which satellite's are "on" for messaging purposes. The satellite's ephemeris is used to predict the satellite's nadir (location). Location information is then used as an index into a table that prescribes the covered LDAs for each beam of any satellite. Using the MABS to discard unavailable beams, an Opportunity Table is created.

In a preferred embodiment, the MABS is a schedule of beams in the "on" state for messaging purposes. The MABS covers 27 orbits of the satellites in the constellation. The MABS includes an effective time for its invocation. The schedule then repeats every 27 orbits for the life of the version of the table. Replacement MABS will have effective times that are on the same 27 orbits cycle.

In a preferred embodiment, the message delivery system uses the "slot" ephemeris for each satellite to predict the nadir (latitude and longitude plus direction) of satellite's for indexing into the table of covered LDAs. "Slot" ephemeris is the ephemeris for the slot (plane and position in the plane) for each satellite. For the OPGEN process, precise information is not necessarily required. In a preferred embodiment, a simple propagator algorithm can be used to predict the satellite nadir. Even though the combination of slot ephemeris and propagator could produce uncertainties in the few kilometers range, when used with LDAs that are about 150 kilometers in diameter the lower precision may not be appreciable.

The method and apparatus of the present invention permit the generation of satellite to earth coverage determination without having to propagate orbital elements and antenna fields of view in real time to determine which satellite is covering which spot at which time. A table is created by using a reference position (e.g. satellite nadir) and predetermining which areas are covered by which beams. When it is desired that a message be delivered in a target LDA and adjacent LDAs, an adjacency procedure, which is made simple by the LDA numbering scheme of the preferred embodiment, can be used to mathematically determine covered LDAs for a beam. In summary, the method and apparatus of the present invention provides substantial time savings in the generation of message delivery schedules.

As an added advantage, the method and apparatus of the present invention, provides the messaging devices with a technique of self geolocation. When a reference LDA is placed in downlink bursts from a satellite, messaging devices can determine their location. In addition, the messaging devices can use this information along with knowledge of the system's transmitting order to pre-correct for Doppler and time uncertainty. This simplifies processing, improves performance, and saves battery life for messaging devices.

The present invention has been described above with reference to a preferred embodiment. However, those skilled in the art will recognize that changes and modifications can be made in this embodiment without departing from the scope of the present invention. For example, while a preferred embodiment has been described in terms of a satellite communication network, the method and apparatus of the present invention also could be used in a terrestrial communication network or a combined satellite/terrestrial network. In addition, a wide variety of LDA numbering schemes and/or LDA sizes/shapes/configurations could be used. The tables described in conjunction with FIGS. 4–6 could be differently configured, and the steps of the method described in conjunction with FIG. 7 could be performed in different orders. Accordingly, these and other changes and modifications which are obvious to those skilled in the art are intended to be included within the scope of the present invention.

What is claimed is:

1. In a satellite-based message delivery system, wherein said satellite-based message delivery system comprises a plurality of non-geostationary satellites, a plurality of messaging devices, and at least one control center, each of said plurality of non-geostationary satellites projecting a plurality of overlapping beams, a method for delivering a message from said at least one control center to a messaging device, said method comprising the steps of:

identifying a number of opportunities for message delivery, said number of opportunities being determined from an opportunity table, wherein a coordinate system is established comprising a number of rows of logical delivery areas (LDAs), each LDA being mathematically related to neighboring LDAs, said opportunity table identifying on a frame by frame basis at least one of said plurality of non-geostationary satellites and at least one of said plurality of overlapping beams for each LDA;

determining a first opportunity from said number of opportunities; and using said first opportunity to deliver said message to said messaging device.

2. The method as claimed in claim 1, wherein said method further comprises the steps of:

determining a second opportunity from said number of opportunities; and using said second opportunity to deliver said message to said messaging device.

3. The method as claimed in claim 1, wherein said determining step further comprises the steps of:

receiving, at said at least one control center, a request to deliver said message to said messaging device;

establishing, at said at least one control center, a first position using said coordinate system, wherein said first position is a location for said messaging device;

determining, at said at least one control center, a first time using a listening schedule for said messaging device, said first time being when said messaging device is scheduled to be active and listening; and indexing said opportunity table using said first position and said first time to determine said first opportunity, said first opportunity identifying when said messaging device is being covered by at least one beam from at least one of said plurality of non-geostationary satellites.

4. The method as claimed in claim 3, wherein said establishing step further comprises the steps of:

establishing, at said at least one control center, said coordinate system using row numbers and position numbers for said plurality of LDAs;

determining, at said at least one control center, an identification number for said messaging device using said request; and establishing, at said at least one control center, a location for said messaging device within said coordinate system, said location being established using said identification number, wherein said location is identified by one of said plurality of LDAs.

5. In a satellite-based message delivery system, wherein said satellite-based message delivery system comprises a plurality of non-geostationary satellites, a plurality of messaging devices, and at least one control center, each of said plurality of non-geostationary satellites projects at least one of a plurality of overlapping beams, a method for delivering a message from said at least one control center to a messaging device using at least one of said plurality of non-geostationary satellites, said method comprising the steps of:

calculating a number of opportunities for message delivery, said number of opportunities being determined from an opportunity table, wherein a coordinate system is established comprising a number of rows of logical delivery areas (LDAs), each LDA being mathematically related to neighboring LDAs, said opportunity table containing locations for said plurality of non-geostationary satellites during a plurality of frames and identifying a number of opportunities for message delivery;

receiving, at said at least one control center, a request to deliver a message to said messaging device;

identifying a first opportunity from said number of opportunities;

using said first opportunity to identify a beam from said plurality of overlapping beams; and delivering said message to said messaging device using said beam.

6. The method as claimed in claim 5, wherein said identifying step further comprises the steps of:

locating, by said at least one control center, said messaging device in a destination LDA, said destination LDA being one of said number of rows of LDAs;

determining, at said at least one control center, a first delivery time based on when said messaging device is listening for said message, wherein said first delivery time is at least one of a plurality of frames;

determining, at said at least one control center, a satellite in said plurality of non-geostationary satellites, said satellite comprising means for delivering said message at said first delivery time, wherein said satellite is determined using said opportunity table; and determining, at said at least one control center, a beam from said plurality of overlapping beams, said beam covering said destination LDA at said first delivery time, wherein said beam is transmitted by said satellite, said beam being determined using said opportunity table.

7. The method as claimed in claim 6, wherein said method further comprises the steps of:

sending, by said at least one control center, said message to said satellite prior to a first delivery time; and transmitting said message from said satellite to messaging device during said first delivery time using said beam.

8. The method as claimed in claim 5, wherein said method further comprises the steps of:

locating, by said at least one control center, said messaging device in a destination LDA, said destination LDA being one of said number of rows of LDAs;

determining, at said at least one control center, a second delivery time;

determining, at said at least one control center, a second satellite in said plurality of non-geostationary satellites, said second satellite comprising means for delivering said message at said second delivery time, wherein said second satellite is determined using said opportunity table;

determining, at said at least one control center, a second beam from said plurality of overlapping beams, said second beam covering said destination LDA at said second delivery time, wherein said second beam is transmitted by said second satellite, said beam being determined using said opportunity table;

sending, by said at least one control center, said message to said second satellite prior to said second delivery time; and transmitting said message from said second satellite to messaging device during said second delivery time using said beam.

9. The method as claimed in claim 5, wherein said method further comprises the steps of:

locating, by said at least one control center, said messaging device in a destination LDA, said destination LDA being one of said number of rows of LDAs;

determining, at said at least one control center, a second delivery time;

determining, at said at least one control center, a second satellite in said plurality of non-geostationary satellites, said second satellite comprising means for delivering said message at said second delivery time, wherein said second satellite is determined using said opportunity table;

determining, at said at least one control center, a second beam from said plurality of overlapping beams, said second beam covering at least one LDA adjacent to said destination LDA at said second delivery time, wherein said second beam is transmitted by said second satellite, said beam being determined using said opportunity table;

sending, by said at least one control center, said message to said second satellite prior to said second delivery time; and transmitting said message from said second satellite to messaging device during said second delivery time using said beam.

10. The method as claimed in claim 5, wherein said method further comprises the steps of:

storing, at said at least one control center, location information for said plurality of messaging devices;

storing, at said at least one control center, scheduling information for said plurality of messaging devices; and storing, at said at least one control center, location information for said plurality of non-geostationary satellites.

11. The method as claimed in claim 5, wherein said method further comprises the steps of:

maintaining system time at said at least one control center;

synchronizing said plurality of non-geostationary satellites to said system time;

synchronizing said plurality of messaging devices to said system time; and using said system time to determine said first opportunity.

12. The method as claimed in claim 5, wherein said method further comprises the steps of:

updating said opportunity table based on a number of orbits for said plurality of non-geostationary satellites, wherein said number of orbits is determined using repetitive positions for said plurality of non-geostationary satellites; and storing said opportunity table at said at least one control center.

13. The method as claimed in claim 5, wherein said method further comprises the step of:

sending a reference location in said message, said reference location being used to geo-locate said messaging device.

14. The method as claimed in claim 5, wherein said method further comprises the step of:

sending scheduling and adjacency information in said message, said scheduling and adjacency information being used to determine said first opportunity.

15. A messaging device for use in a message delivery system, wherein said messaging device comprises:

an antenna, said antenna for establishing links to a plurality of non-geostationary satellites;

a transceiver coupled to said antenna, said transceiver supporting said links to said plurality of non-geostationary satellites;

a processor coupled to said transceiver, said processor controlling said transceiver, processing messages sent to said messaging device, determining scheduling information from said messages, determining reference position information from said messages, and establishing location in a coordinate system using said reference position information, said coordinate system comprising a number of rows of logical delivery areas (LDAs), each LDA being mathematically related to neighboring LDAs; and a memory coupled to said processor, said memory storing data, wherein said data comprises operational instructions, location data, and scheduling data.

16. The messaging device as claimed in claim 15, wherein said messaging device further comprises:

a battery coupled to said transceiver, to said processor, and to said memory, said battery providing standby power in a sleep mode and operating power in a operational mode.

17. A method for operating a messaging device in a message delivery system, said method comprising the steps of:

receiving a message;

processing said message;

determining a reference position from said message, said reference position describing a satellite's location in a coordinate system based on logical delivery areas, said coordinate system comprising a number of rows of logical delivery areas (LDAs), each LDA being mathematically related to adjacent LDAs; and determining a location for said messaging device in said coordinate system using said reference position.

18. A method for operating a messaging device as claimed in claim 17, said method further comprising the step of:

determining schedule information from said message, said schedule information establishing at least one active time when said messaging device is awake and listening.

* * * * *